March 3, 1959 S. B. DISSON 2,876,442

COMPENSATION MEANS IN MAGNETIC CORE SYSTEMS

Filed Feb. 28, 1956

INVENTOR.
STANLEY B. DISSON

BY

[signature]

ATTORNEY

United States Patent Office 2,876,442

Patented Mar. 3, 1959

2,876,442

COMPENSATION MEANS IN MAGNETIC CORE SYSTEMS

Stanley B. Disson, Broomall, Pa., assignor to Burroughs Corporation, Detroit, Mich., a corporation of Michigan Application February 28, 1956, Serial No. 568,252

7 Claims. (Cl. 340—174)

Figure 1:
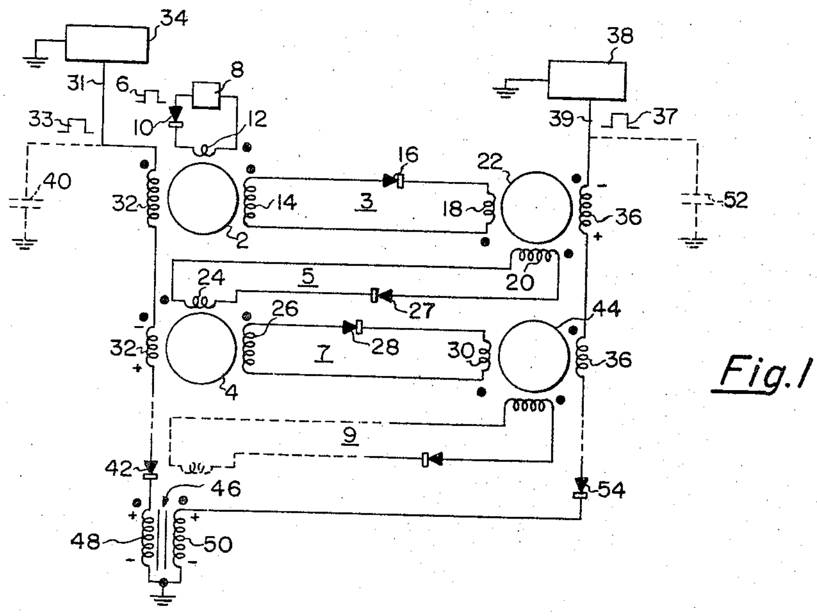

This invention relates to magnetic storage devices, and more particularly to shift registers employing bistable magnetic elements.

In computing machines and the like, wherein information is stored and operated upon, one utilizes a storage unit comprising a chain or an array of storage devices so arranged that data stored therein may be sequentially shifted along such chain or array. For example, if information were to be stored in such a machine in binary form and be represented by the number 11100, after one shift to the right, such number would be stored as 01110 in the machine; after the second successive shift to the right, such number would be stored as 00111. It is usual for the registration of a blank position to be the same as that of a binary "0" in known storage devices and this convention is followed in the present discussion. Such a storage device is known as a "shift register" or "shifting register" and is shown and described in an article by A. D. Booth entitled "An Electronic Digital Computer" published in "Electronic Engineering" for December 1950.

In the shift registers of the above cited Booth article employing bistable magnetic elements, the bistable elements are normally arranged in two chains, the first chain maintaining the information read into the machine. A first current pulse, called an "advancing" or "shifting" pulse and obtained from a suitable pulse source, is applied to a winding that links all the magnetic elements of the first chain. This current pulse is effective to switch all the bistable cores of that first chain to their respective "0" states. An output circuit is associated with each element in the first chain and a corresponding bistable element that is part of the second chain. When an element of the first chain contains a "0" or is in its "0" storage state, the advancing current pulse applied to such element does not produce a significant output in the output circuit associated with such element, so no significant pulse is applied as an input signal to the corresponding element of the second chain. If the element of the first chain contains a "1" or is in its "1" storage state, the advancing current pulse is effective to switch such element to its "0" state and thereby produce a significant output current pulse in its associated output circuit. Such output current pulse will be effective to switch the associated binary element in the second chain to its "1" state if it were in its "0" state, or leave it in its "1" state if it were already there.

As is pointed out in such Booth article, information is transferred or shifted along successive elements of the first chain. The second chain of binary elements serves as a delay means for storing the information read out of the first chain during the interval that new information is being read into the elements of the first chain. The advancing current pulse is applied to the common winding that threads all the elements in the first chain in order to transfer stored information to the storage elements in the second chain. An advancing current pulse is subsequently applied to a common winding that threads all the elements of the second chain of storage elements which forms the delay means so as to transfer the information stored in the delay means back to the storage elements of the first chain but one digit position advanced along the first chain. Such shift registers are generally referred to as two core per bit shift registers because two cores (where magnetic cores having a substantially square hysteresis loop are employed as the storage elements of binary information) are needed for operation upon a single digit, namely, a first core into which information is read and a second core for storing such information when the first core is cleared of its information so that the latter may be readied for the receipt of new information.

It was recognized in carrying out the operation of a two core per bit shift register that, in the process of transferring information from the second chain back to the first chain of cores, undesirable voltages are induced in the common winding that forms the shift winding of the first chain. These undesirable voltages are in a direction such as to act as a load additive to the load presented by the cores in the first chain. This added load may, in a shift register employing many bistable storage elements, be sufficiently high to prevent the proper switching of the required bistable element or elements.

This invention overcomes this undesirable loading of cores by applying a compensating voltage to the common advancing winding of the second chain of binary elements at the time that the first chain of binary elements is being switched, such compensating voltage opposing the voltage induced in such common advancing winding. In a similar manner, a compensating voltage is applied to the common advancing winding of the first chain of binary elements at the time that the second chain of binary elements is being switched.

An object of the present invention is to provide an improved computing device employing shift registers.

A further object is to improve the reliability of switching of binary elements, particularly when such elements are being switched by a common switching winding.

Yet another object is to increase the number of binary elements that may be reliably switched simultaneously by an advancing winding associated with such binary elements.

Figure 2:
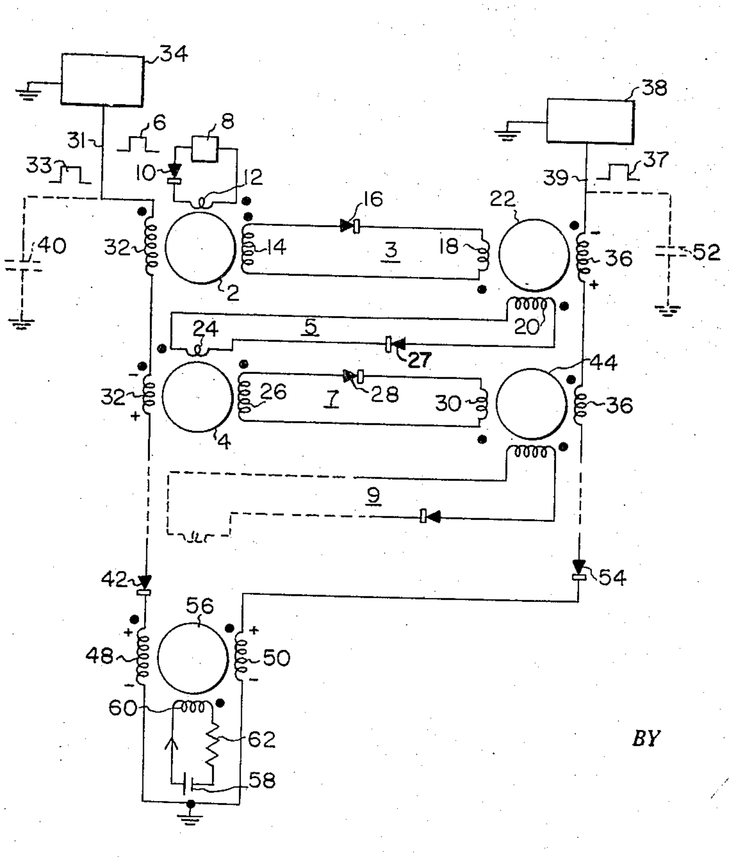

The aforementioned objects may be carried into effect by following the teaching of the present invention wherein:

Fig. 1 illustrates an embodiment of the present invention as it is applied to a two core per bit shift register, and Fig. 2 is a modification of the embodiment shown in Fig. 1.

Fig. 1 illustrates a two core per bit shift register wherein circles 2, 4, etc. represent conventional bistable magnetic cores having substantially square hysteresis loop characteristics and forming a first chain of elements. Cores 22, 44, etc. form the second chain of bistable magnetic elements and may be considered the delay cores of the shift register. Information in the form of a signal pulse 6 emanates from any suitable pulse source 8 to cause current to flow through diode 10 and through the undotted terminal of winding 12. Initially all the cores are assumed to be in their respective "0" states. The dot notation is a convention for illustrating the manner of wrapping a winding about its associated core. When current enters the dotted terminal of a winding associated with a core, such current will tend to switch the core to its "0" state. Current entering the undotted terminal of a winding will tend to switch a core associated with such winding to its "1" state.

The signal pulse source 8 represents means for serially reading information into the first chain of cores 2, 4, etc. It should be noted that the invention does not exclude and even contemplates the parallel read-in information into cores 2, 4, etc. Since such read-in of information is incidental to the practice of the invention, no showing of more than a single read-in circuit is deemed necessary. A single diode transfer loop 3 couples core 2 to core 22 and consists of an output winding 14, a diode 16, and an input winding 18. For reasons that will be explained hereinafter, the number of turns in the output winding 14 of core 2 in transfer loop 3 exceeds the number of turns of the input winding 18. Transfer loop 5 couples core 22 with core 4 and comprises output winding 20, diode 27, and input winding 24. Transfer loop 7, with its output winding 26, diode 28, and input winding 30, couples cores 4 and 44.

Associated with each core 2, 4, etc. is a shift or advancing winding 31 which receives pulses 33 from the core-driver pulse source 34. The shift winding 31 has a plurality of turns 32 on it associated with each core in the chain. Similarly, an advancing or shift winding 39 is associated with each core 22, 44, etc. and each winding 36 is made to conduct current through its dotted terminal because of the application of a pulse 37 to windings 36 from core-driver pulse source 38. Each winding 32 has a certain inherent capacity that exists between each of its turns and when a relatively large number of cores composes a chain, the sum of the capacities becomes a significant factor which must be taken into account in the design of a shift register. The sum of such capacities of windings 32 and 36, respectively, is represented as a dotted lumped capacitor 40 or 52.

Assume that at time $t_0$ an input pulse 6 is applied to winding 12 so as to cause switching current to course through winding 12 and switch core 2 to its "1" state. Since current enters the undotted terminal of winding 12, upon switching of core 2 to its "1" state a voltage is induced in output winding 14 which induced voltage causes current to flow out of the undotted terminal of output winding 14. But such flow of current in transfer loop 3 is into the high impedance side of diode 16 so no current flows into winding 18 to switch core 22. The reading-in of a "1" into core 2 is unaccompanied by any change in core 22.

At time $t_1$, or at some time after $t_0$ when information has been entered into the shift register, the core-driver pulse generator 34 transmits a pulse to shift winding 31 which passes through the plurality of turns 32 and switches core 2 to its "0" state. Since the switching current for core 2 now flows into the dotted terminal of plural turns winding 32, the current induced in output winding 14 is out of the dotted terminal of winding 14. Such induced current flow is in the forward direction of current flow through diode 16 so that induced current flows into the undotted terminal of winding 18 to switch core 22 to its "1" state. At time $t_2$, shift winding 39 is pulsed with a driving current pulse to switch core 22 to its "0" state. Such switching of core 22 to its "0" state induces a current flow out of the dotted terminal of output winding 20, through the low impedance side of diode 27, through the undotted terminal of input winding 24 and back to winding 20. The flow of current through the undotted terminal of input winding 24 switches core 4 to its "1" state, completing, in two shift pulse intervals, the transfer of the "1" stored in core 2 to its adjacent core 4 in the chain. The switching of core 22 to its "0" state also induces current to flow out of the dotted terminal of its own input winding 18 into the undotted terminal of winding 14 and through the forward direction of diode 16 so as to tend to read a "1" into core 2. Such backward flow of information is undesirable. However, by choosing a favorable turns ratio between winding 14 and winding 18, for example, by making the number of turns of winding 14 greater than the number of turns on winding 18, the tendency to produce such backward flow of information is reduced enough to provide successful operation.

The shift register of Fig. 1 will operate in the manner described above if the capacitive effects of the plural turns windings 32 and 36 are ignored. However since such capacitive effects cannot be ignored, one must introduce means in the shift register to overcome them. For illustrative purposes, the invention will be described with dotted capacitor 40 representing the lumped capacity of shift winding 31. When at time $t_2$ a shifting pulse is applied to windings 36 in order to read out the information stored in the chain composed of cores 22, 44, etc., transfer loops 5, 9, etc. will transfer the information stored in such cores 22, 44, etc. to core 4 and other successive cores, not shown, that form the first chain. If a "1" were stored in a core such as core 22 at the time that a shift pulse were applied to winding 36, such "1" would be transferred to core 4 and would tend to switch core 4 to its "1" state. As soon as core 4 begins to switch toward its one state, its associated plural turns winding 32 has a potential developed across it that opposes this shift. The polarities of such induced potential is shown to the left of plural turns winding 32 associated wtih core 4. This potential is in the forward direction of a disconnect diode 42 inserted in the shift winding circuit so that current will tend to flow to charge the lumped capacity 40. This charging of the lumped capacitor will act as a load requiring that the switched core 22 supply not only enough energy to switch core 4 but also to overcome the loading effect of the stray capacity in the shift winding circuit associated with the first chain of cores. In a chain containing many cores, the loading may be sufficient to prevent complete switching of a core such as core 4.

Assume that lumped capacitor 40 has a value of $100\times10^{-12}$ farads wherein only ten cores make up a chain. The undesirable induced potential would have a peak value of about 5 volts per core being switched to the "1" state and such induced potential will endure for about $1\times10^{-6}$ seconds. For a chain containing ten switching cores, the current loading at peak induced voltage would be approximately $$i=100\times10^{-12}\text{ farads}\times\frac{(5\times10\text{ volts})}{(1\times10^{-6}\text{ sec.})}$$

or $5\times10^{-3}$ amperes. A current of 5 ma. charging lumped capacitor 40 would present a substantial load to the driven cores 22, 44, etc. of the second chain and may prevent the complete switching of cores such as core 4, causing noise or inaccurate transmission of information in the shift register.

To avoid the aforementioned difficulties encountered in prior art shift registers, the present invention relies on a pulse transformer 46 comprising windings 48 and 50 which have substantially the same number of turns and are wound in the manner depicted by the dot notation accompanying the windings.

It is to be understood, however, that the number of turns of winding 48 need not be the same as the number of turns of winding 50 where the normal load for the first chain of cores is not the same as the normal load of the second chain of cores. In such case of unequal loading the windings 48 and 50 may have a turns ratio other than 1. When the current-driver 38 is pulsed at time $t_2$ causing cores 22, 44, etc. to be cleared to their respective "0" states, any "1's" in cores 22, 44, etc. will be transferred to the cores in the first chain, such transfer inducing a potential in windings 32 whose polarity is shown to the left of winding 32 associated with core 4. At the same time the clearing current traverses windings 36 it also flows through the dotted terminal of winding 50 of pulse transformer 46. The current pulse through winding 50 induces a potential in winding 48 which, as shown to the left of winding 48, opposes the potential induced in winding 32 due to the switching of a core such as core 4. As a consequence, the lumped capacity 40 is not charged with current to load a driver core such as core 22.

Windings 48 and 50 have a greater number of turns than any of the individual windings 32 and 36, the number being large enough to anticipate and compensate for the transfer of all "1's" from one chain to another chain. Either winding 48 or 50 may be deemed the primary winding and the other the secondary winding for the transformer 46. Since the compensating potential induced across winding 48 is a voltage change and diode 42 prevents the passage of current back to the driver circuit, no induced current ever flows from winding 48 to charge lumped capacitor 40. The induced potential supplies bucking or opposing voltage to compensate for the voltage induced in the plural turns windings 32 upon transfer of all "1's" from the second chain of cores to the first chain of cores and is also available to supply such opposing voltage when only a fraction of the cores in the second chain are switched from "1" to "0." The lumped capacity of windings 36 is represented by dotted capacitor 52 and disconnect diode 54 is similar to disconnect diode 42. When at time $t_1$ the cores 2, 4, etc. of the first chain are cleared by a current pulse from core driver source 34, cores 22, 44, etc. may be switched to their respective "1" states. Such switching of the cores in the second chain to their respective "1" states will induce an undesired potential in their associated windings 36 so as to add an undesired load for the cores of the second chain. By applying a pulse at time $t_1$ to winding 48 at the same time that cores 2, 4, etc. are being read out, a potential is induced in winding 50 that opposes this undesired load, making the cores 22, 44, etc. switch more readily.

It is noted that since the induced potentials and bucking or opposing potentials exist substantially simultaneously, it is permissible to dispense with diodes 42 and 54. The lumped capacity will not be charged except by a negligible current resulting from the difference between such induced potentials and bucking potentials.

Fig. 2 is an embodiment of Fig. 1 wherein the 1:1 pulse transformer 46 is replaced by a core 56 which is similar to the other cores 2, 4, etc. save that it may be larger to accommodate the increased number of turns that must be wrapped about it. The core 56 should be selected to have the proper flux capabilities and turns to supply the required voltage output. Core 56 is biased so as to be constantly set to its "1" state. Such biasing means would include any D.-C. source, represented by battery 58, winding 60 and resistor 62. When current driver 34 is pulsed to switch the cores of the first chain, current through the dotted terminal of winding 48 will switch core 56 toward its "0" state, such switching will induce a compensating voltage in winding 50 similar to the compensating voltage induced by the pulse transformer of Fig. 1. In a like manner, the pulsing of core driver pulse-source 38 will switch core 56 toward its "0" state so as to induce a compensating voltage in winding 48.

In the interval when current drivers 34 and 38 are not operating, D.-C. source 58 resets core 56 to its "1" state. Resistor 62 is employed to slow down the speed of resetting core 56 to its "1" state so that negligible voltage is induced in windings 48 and 50 during such reset. Such slowing down of the resetting operation is desirable because the induced voltage in windings 48 and 50 during reset is in the forward direction of diodes 42 and 54 which may result in a partial switching of the cores in both chains if relatively high current flows through windings 32 and 36 as a result of such resetting of core 56 to its "1" state.

It is understood that pulses emanating from pulse-generator sources 34 and 38 are clock pulses that appear at regular spaced apart intervals to alternately drive the two chains of cores that form the shift register and such sources of driving pulses are well known in the art. It matters not whether the sources are a transformer type current driver, or drives using a thyratron, a vacuum tube, or a transistor in the core load circuit, since the illustrated embodiment of the invention concerns rather the technique of applying an opposing voltage to a second chain of shift windings at the same time that the first chain of shift windings is being actuated, and vice versa. In passing, it may be noted that where the current driver 34 or 38 is a vacuum tube driver, or thyratron, and the bistable core load is in the cathode circuit of the driver, the undesired induced voltage may place a negative voltage on the cathode circuit and cause the vacuum tube, or thyratron current driver, to fire prematurely. The bucking or compensating voltage produced by this invention will also prevent such premature firing of the vacuum tube driver. Somewhat similar difficulties arise when the driver has a transistor in the core circuit.

This invention also encompasses the combining of logic circuits with a system similar to a shift register. For example, there are "and," "or," and gating circuits that employ magnetic cores wherein such circuits are threaded by the same winding that threads a chain of cores in a shift register. In such a combination, the cores in the logic circuits are wound so as to be loaded in a manner similar to the manner in which the cores 2, 4, etc. of the first chain of cores are loaded when binary information is being transmitted to them. Consequently the instant invention contemplates the application of compensating or bucking voltages to logic circuits as well as to a chain of cores in a shift register.

The instant invention has provided a practical system for operating a two core per bit shift register or logic circuits operated by common shift windings so as to avoid the deleterious effects of voltages induced in the shift windings during their normal operation. By supplying reliable means for offsetting such undesired induced voltages, the storage capacity of a shift register or logic circuit is increased. It is increased because more cores can be employed in a chain of cores than was heretofore used, such increased number of cores being tolerated because of the compensation for stray capacitive effects in the aforementioned systems employing such cores.

What is claimed is:

1. In a two core per bit shift register employing two chains of bistable magnetic cores for storing information in binary form therein wherein a common shift winding having a plurality of turns therein is associated respectively with each chain of cores, a first group of transfer circuits coupling each core of the first chain with a corresponding core of the second chain, a second group of transfer circuits coupling each core of the second chain with each of a succeeding core in the first chain, means for applying a shift pulse to one shift winding so as to transfer information from one chain of cores to the other chain of cores through said transfer loops, and a pulse transformer coupling said common shift windings whereby the application of said shift pulse to the said one shift winding will cause said transformer to induce a potential in the other shift winding, said induced potential opposing that potential induced in said other shift winding when information is being transferred from said one chain of cores to the other chain of cores.

2. A system as defined in claim 1 wherein the windings of the pulse transformer have a substantially 1:1 turns ratio.

3. In a two core per bit shift register, employing two chains of bistable magnetic cores wherein a common shift winding is associated respectively with each chain of cores, means for applying a shift pulse to the common shift winding associated with the first chain of cores, means for applying a shift pulse to the common shift winding associated with the second chain of cores, and transformer means joining the two shift windings for inducing a voltage in the second shift winding upon application of a shifting pulse to the first shift winding, said transformer means including a single bistable magnetic core not associated with either chain of cores, circuit means for biasing said core to a first bistable state other than the one to which it would be set by the shifting pulse being applied serving to override said biasing means and switch said single bistable core to its second state, such switching producing the aforementioned induced voltage in said second shift winding.

4. A system as defined in claim 3 wherein a resistor is included in the circuit means biasing said single core to its first stable state, said resistor serving to slow down the speed at which said single core is reset to its first stable state when a shifting pulse is terminated.

5. In a two core per bit shift register employing two chains of bistable magnetic cores having a common shift winding associated with each chain of cores, means for applying a shift pulse to the common shift winding associated with a first chain of cores, means for applying a shift pulse to the common shift winding associated with the second chain of cores, transformer means having a primary winding and a secondary winding and wherein said windings have a substantially unity ratio, said primary and secondary windings being magnetically coupled and also serving to couple the first common shift winding to the second common shift winding, a single bistable core capable of assuming two discrete opposite states of magnetic remanence coupled to said primary and secondary windings, circuit means for biasing said single core to a first state which is opposite to the state to which it would tend to be switched when a shifting pulse is applied to a common shift winding whereby upon the application of a shifting pulse to either shift winding said bias is overcome and the single core switches to its other state so as to induce a voltage in the other common shift winding.

6. A system such as defined in claim 5 wherein the bias means for said single core comprises a series circuit including a D.-C. source of energy, a winding magnetically coupled to said single core, and a resistive element.

7. First and second magnetic cores each capable of assuming either of two stable states of magnetic remanence, one of said states being considered a reference state; an input winding on said first core which, when energized by an input pulse, switches or tends to switch said first core to the state other than said reference state; first shift means, including a shift winding on said first core, which when energized by a first shift current pulse switches or tends to switch said first core to said reference state; an output winding on said first core responsive to the switching of said first core from said other state to said reference state for developing an output signal; an input winding on said second core; means for applying said first-core output signal to said second-core input winding for switching or tending to switch said second core to said state other than said reference state; second shift means, including a shift winding on said second core, which when energized by a second shift current pulse switches or tends to switch said second core to said reference state; an output winding on said second core responsive to the switching of said second core from said other state to said reference state for developing a second-core output signal; and compensating means for opposing the development of a current pulse in said second-core shift winding when said second core is switched from said reference to said other state in response to said first-core output signal, said compensating means comprising transformer means having a first winding in series with said first-core shift winding and a second winding in series with said second-core shift winding, said first and second winding being mutually coupled and so poled that the passage of said first shift current pulse through said first winding induces a voltage in said second winding of a polarity to oppose and of a magnitude to substantially reduce the voltage induced in said second-core shift winding when said second core is switched from said reference to said other state.

References Cited in the file of this patent

UNITED STATES PATENTS

| | | |
|---|---|---|
| 2,751,546 | Dimmer | June 19, 1956 |
| 2,769,925 | Saunders | Nov. 6, 1956 |